United States Patent
Barlow et al.

(10) Patent No.: US 7,167,972 B2
(45) Date of Patent: *Jan. 23, 2007

(54) VECTOR/SCALAR SYSTEM WITH VECTOR UNIT PRODUCING SCALAR RESULT FROM VECTOR RESULTS ACCORDING TO MODIFIER IN VECTOR INSTRUCTION

(75) Inventors: Stephen Barlow, Cambridge (GB); Neil Bailey, Cambridge (GB); Timothy Ramsdale, Cambridge (GB); David Plowman, Saffron Walden (GB); Robert Swann, Cambridge (GB)

(73) Assignee: Broadcom Europe Limited, Cambridge (GB)

(*) Notice: Subject to any disclaimer, the term of this patent is extended or adjusted under 35 U.S.C. 154(b) by 310 days.

This patent is subject to a terminal disclaimer.

(21) Appl. No.: 10/284,302

(22) Filed: Oct. 31, 2002

(65) Prior Publication Data
US 2003/0154361 A1   Aug. 14, 2003

(30) Foreign Application Priority Data
Oct. 31, 2001   (GB) .................................. 0126135.3

(51) Int. Cl.
*G06F 9/302* (2006.01)
(52) U.S. Cl. ........................................ 712/222; 712/22
(58) Field of Classification Search .................... 712/3, 712/4, 22, 222
See application file for complete search history.

(56) References Cited

U.S. PATENT DOCUMENTS

| | | | | |
|---|---|---|---|---|
| 4,541,046 A | * | 9/1985 | Nagashima et al. ........... 712/3 |
| 5,179,530 A | * | 1/1993 | Genusov et al. ............. 708/520 |
| 5,430,884 A | * | 7/1995 | Beard et al. ..................... 712/3 |
| 5,446,913 A | | 8/1995 | Chou et al. ..................... 712/2 |
| 5,517,666 A | * | 5/1996 | Ohtani et al. ................... 712/3 |
| 5,537,562 A | * | 7/1996 | Gallup et al. ............... 712/234 |
| 5,805,875 A | | 9/1998 | Asanovic ..................... 712/222 |
| 5,895,501 A | * | 4/1999 | Smith .......................... 711/207 |
| 5,941,938 A | * | 8/1999 | Thayer ....................... 708/490 |

FOREIGN PATENT DOCUMENTS

| | | |
|---|---|---|
| EP | 0 517 013 A2 | 12/1992 |
| EP | 0 607 988 A1 | 7/1994 |
| WO | WO 91/10194 | 7/1991 |
| WO | WO 91/10194 A1 | 7/1991 |

* cited by examiner

Primary Examiner—Kenneth S. Kim
(74) Attorney, Agent, or Firm—McAndrews, Held & Malloy, Ltd.

(57) ABSTRACT

Described herein is a processor for executing instructions and a method therefor. The processor comprises a scalar unit for executing scalar instructions each defining a single value pair; a vector unit for executing vector instructions each defining multiple value pairs; and an instruction decoder for receiving a single stream of instructions including scalar instructions and vector instructions and operable to direct scalar instructions to the scalar unit and vector instructions to the vector unit. The vector unit can comprises a plurality of value processing units and a scalar result unit. The scalar unit can comprise a scalar register file. Communication between the vector unit and the scalar unit is enabled by allowing the vector unit to access the scalar register file and allowing the scalar unit to access output from the scalar result unit. The output of the scalar result unit may be based on the relative magnitudes of outputs from the plurality of value processing units.

33 Claims, 8 Drawing Sheets

| Bit | Field | | |
|---|---|---|---|
| 32 | Rb_V | Immed(0) | |
| 33 | Rb_USX | Immed(1) | |
| 34 | Rb_XY(0) | Immed(2) | |
| 35 | Rb_XY(1) | Immed(3) | If Rb IMM = 1 |
| 36 | Rb_XY(2) | Immed(4) | |
| 37 | Rb_XY(3) | Immed(5) | |
| 38 | Rb_X(4) | Cond(0) | |
| 39 | Rb_X(5) | Cond(1) | |
| 40 | Rb_Y(4) | Cond(2) | |
| 41 | Rb_Y(5) | SETF | |
| 42 | Rb_IMM | | |
| 43 | Ra_XY(0) | | |
| 44 | Ra_XY(1) | | |
| 45 | Ra_XY(2) | | |
| 46 | Ra_XY(3) | | |
| 47 | Ra_X(4) | | |

Half-word 2

| 16 | Ra_X(5) |
| 17 | Ra_Y(4) |
| 18 | Ra_Y(5) |
| 19 | Ra_USX |
| 20 | Ra_V |
| 21 | Rdab_SX(0) |
| 22 | Rdab_SX(1) |
| 23 | Rdab_SX(2) |
| 24 | Rd_XY(0) |
| 25 | Rd_XY(1) |
| 26 | Rd_XY(2) |
| 27 | Rd_XY(3) |
| 28 | Rd_X(4) |
| 29 | Rd_X(5) |
| 30 | Rd_Y(4) |
| 31 | Rd_Y(5) |

Half-word 1

| 0 | Rd_USX |
| 1 | Rdab_16BI |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=1 |
| 10 | 0 |
| 11 | 0 |
| 12 | 0 |
| 13 | 0 |
| 14 | 0 |
| 15 | 0 |

Half-word 0

Compact 48-bit Encoding

FIG. 7(I)

| Bit | Field |
|---|---|
| 32 | Rb_V / Immed(0) |
| 33 | Rb_CIRC / Immed(1) |
| 34 | Rb_XY(0) / Immed(2) |
| 35 | Rb_XY(1) / Immed(3) |
| 36 | Rb_XY(2) / Immed(4) |
| 37 | Rb_XY(3) / Immed(5) |
| 38 | Rb_X(4) / Immed(6) |
| 39 | Rb_X(5) / Immed(7) |
| 40 | Rb_Y(4) / Immed(8) |
| 41 | Rb_Y(5) / Immed(9) |
| 42 | Rb_IMM |
| 43 | Ra_XY(0) |
| 44 | Ra_XY(1) |
| 45 | Ra_XY(2) / Ra_X(2) |
| 46 | Ra_XY(3) / Ra_X(3) |
| 47 | Ra_X(4) |
| 16 | Ra_X(5) |
| 17 | Ra_Y(4) |
| 18 | Ra_Y(5) |
| 19 | Ra_CIRC |
| 20 | Ra_V / SETF |
| 21 | Rd_SX(0) |
| 22 | Rd_SX(1) |
| 23 | Rd_SX(2) |
| 24 | Rd_XY(0) |
| 25 | Rd_XY(1) |
| 26 | Rd_XY(2) |
| 27 | Rd_XY(3) |
| 28 | Rd_X(4) |
| 29 | Rd_X(5) |
| 30 | Rd_Y(4) |
| 31 | Rd_Y(5) |
| 0 | Rd_CIRC |
| 1 | Rd_16BIT |
| 2 | Rd_V |
| 3 | I(0) |
| 4 | I(1) |
| 5 | I(2) |
| 6 | I(3) |
| 7 | I(4) |
| 8 | I(5) |
| 9 | CMPT=0 |
| 10 | 0 |
| 11 | 0 |
| 12 | 0 |
| 13 | 0 |
| 14 | 0 |
| 15 | 0 |

Bits 32–47: Half-word 2
Bits 32–41: If Rb_IMM = 1 or Rb_IMM2 = 1
Bits 45–46: If Ra_SP = 1
Bit 20 (SETF): If Ra_SP = 1
Bits 16–31: Half-word 1
Bits 0–15: Half-word 0
Full 80-bit Encoding

FIG. 7(II)

| | | |
|---|---|---|
| 64 | SRU_SX(0) | |
| 65 | SRU_SX(1) | |
| 66 | SRU_SX(2) | |
| 67 | SRU(0) | |
| 68 | SRU(1) | |
| 69 | Rep(0) | |
| 70 | Rep(1) | |
| 71 | Rep(2) | |
| 72 | REPLT | |
| 73 | ACC | |
| 74 | CLRA | |
| 75 | Cond(0) | |
| 76 | Cond(1) | |
| 77 | Cond(2) | |
| 78 | SETF | |
| 79 | - | |
| 48 | Rd_++ | |
| 49 | Ra_SX(0) | |
| 50 | Ra_SX(1) | |
| 51 | Ra_SX(2) | |
| 52 | Ra_x++ | |
| 53 | Ra_Y(0) | |
| 54 | Ra_Y(1) | |
| 55 | Ra_y++ | Ra_Y(2) |
| 56 | Ra_16BIT | Ra_Y(3) |
| 57 | Ra_SP | |
| 58 | Rb_++ | Immed(10) |
| 59 | Rb_16BIT | Immed(11) |
| 60 | Rb_SX(0) | Immed(12) |
| 61 | Rb_SX(1) | Immed(13) |
| 62 | Rb_SX(2) | Immed(14) |
| 63 | Rb_IMM2 | Immed(15) |

Half-word 4: bits 64–79
Half-word 3: bits 48–63

If Ra_SP = 1
If Ra_IMM = 1
If Rb_IMM = 1 or Rb_IMM2 = 1

FIG. 7(III)

VECTOR/SCALAR SYSTEM WITH VECTOR UNIT PRODUCING SCALAR RESULT FROM VECTOR RESULTS ACCORDING TO MODIFIER IN VECTOR INSTRUCTION

The present invention relates to a processor and in particular to instruction execution in a processor.

It is increasingly the case that processors are being purpose built to fulfil the requirements of particular applications. The present invention concerns particularly, but not exclusively, a processor architecture for use in image processing or other multi-media applications.

Existing processor architectures use differing combinations of so-called scalar units and vector units. In the following, a scalar unit implies a unit capable of executing instructions defining a single operand set, that is, typically operating on a pair of source values and generating a destination value for each instruction. A vector unit operates in parallel on a plurality of value pairs to generate a plurality of results. These are often provided in the form of packed operands, that is two packed operands provide a plurality of value pairs, one from each operand in respective lanes.

Existing processor architectures use a scalar processor unit for multi-media processing. However, because there is little or no parallelism in this approach, the processor has to run very quickly. Even if the processor is capable of running quickly, it will be inefficient in terms of power consumption.

Other approaches have considered the coupling of a scalar processor with a vector processing unit. However, it is difficult to establish an architecture in which the advantages of the scalar unit and the vector processing unit can be maximized without placing restrictions on the processor operation. For example, if the vector unit is a separate processor it is difficult to achieve sufficiently tight integration to enable the scalar unit and the vector unit to work efficiently together.

Alternatively, if the vector unit is part of the same processor as the scalar unit, it is difficult to construct a unit with sufficient parallelism but which can communicate intelligently enough with the scalar unit. It is also difficult for the scalar unit to keep the vector unit fed with enough data to achieve significant performance gains.

It is an aim of the present invention to overcome or at least mitigate such problems.

According to one aspect of the present invention there is provided a processor comprising: a scalar processing unit for executing scalar instructions each defining a single value pair; a vector processing unit for executing vector instructions each defining multiple value pairs, the vector processing unit comprising a plurality of value processing units each operable to process one of said multiple operand sets and to generate a respective result; and an instruction decoder for receiving a single stream of instructions including scalar instructions and vector instructions and operable to direct scalar instructions to the scalar unit and vector instructions to the vector unit.

Another aspect of the invention provides a method of operating a processor having a scalar processing unit and a vector processing unit, the method comprising: fetching a stream of instructions including scalar instructions and vector instructions; decoding said instructions and supplying said scalar instructions to a scalar processing unit for execution, and said vector instructions to a vector processing unit for execution; in the vector processing unit, executing said vector instructions in a plurality of value processing units, each operable to process at least a pair of values defined by the vector instruction; and, for at least some of said vector instructions, supplying the results of executing said vector instructions selectively to the scalar processing unit.

A still further aspect of the invention provides a computer program comprising a common instruction space including executable instruction streams, each instruction stream including scalar instructions and vector instructions, wherein each scalar instruction defines a single operand set and each vector instruction defines multiple operand sets, the computer program being loadable into a computer and co-operable therewith such that scalar instructions are executed by a scalar processing unit of the computer and vector instructions are executed by a vector processing unit of the computer.

In a particularly preferred embodiment of the invention, the vector processing unit comprises a scalar result unit connected to receive the results from the value processing units and to generate therefrom a scalar result.

In the embodiment which is described, the semantics of the vector instructions and scalar instructions are flexible enough that a vector instruction can define source values either in the vector unit, in the scalar unit or in a data memory. Moreover, the vector unit can return its results either back to the vector unit itself or to the scalar unit.

This provides flexibly coupled vector and scalar processing units which can communicate effectively with each other to maximise the advantages of each unit.

As will be seen in the following, the organisation of the instructions is such that the instructions most suited to each unit are organised into vector instructions and scalar instructions which are detected at the decode stage and supplied respectively to the appropriate unit for execution. Each vector instruction can identify two source packed operands, each operand containing a plurality of values in respective lanes. In the following, which describes a graphics processor, values are often referred to therein as pixels, because they represent the same.

For a better understanding of the present invention, and to show how the same may be carried into effect, reference will now be made by way of example to the accompanying drawings, in which:

FIG. 3A is exemplary 16 bit encodings of scalar instruction;

FIG. 3B illustrates bits 0 to 15 of a vector instruction;

FIG. 7 illustrates 48 bit and 80-bit encodings of vector instruction.

Figure 1:
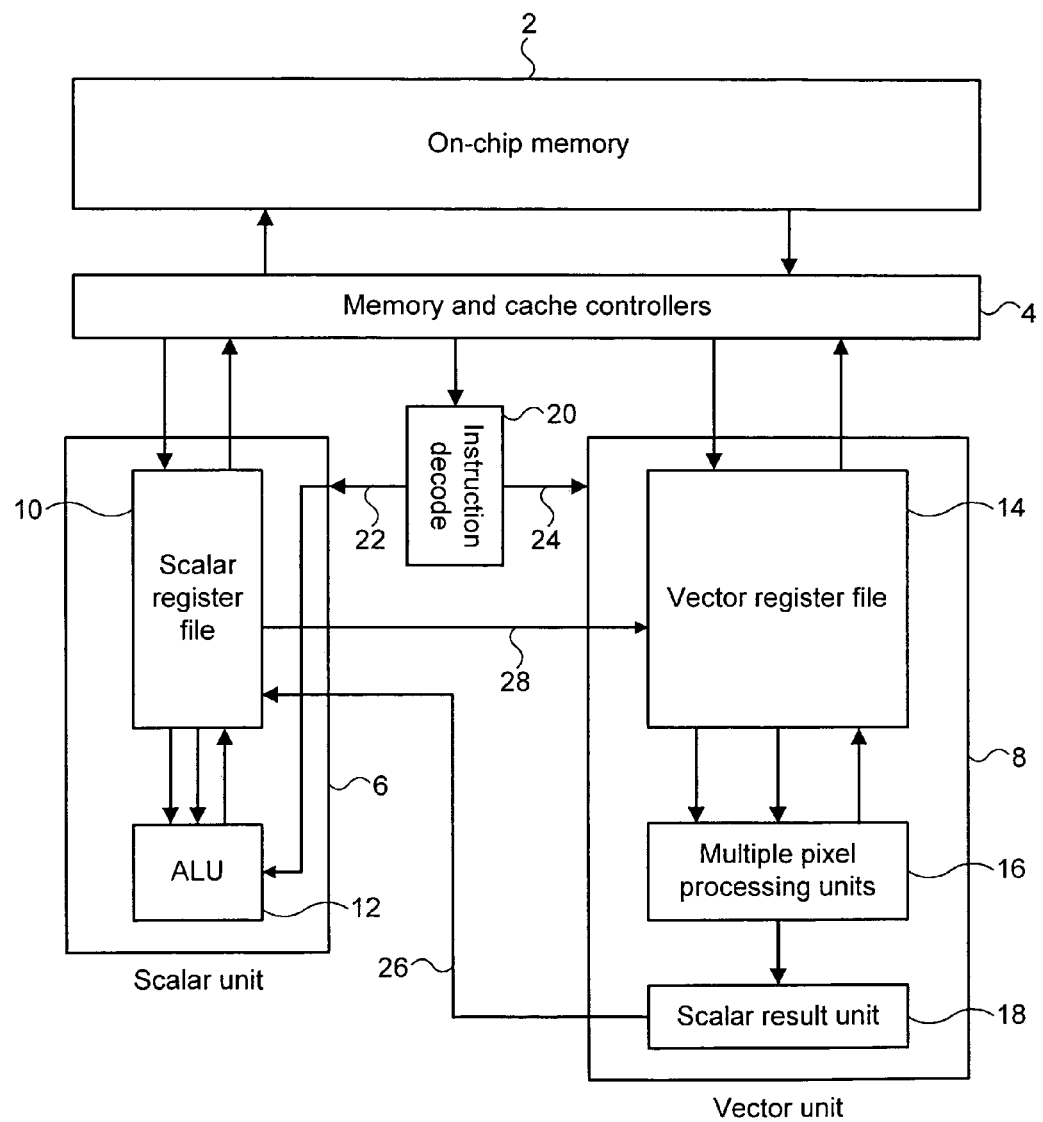
FIG. 1 is a schematic block diagram of the processor architecture.

FIG. 1 is a schematic block diagram of a processor in accordance with one embodiment of the invention. An on-chip memory 2 holds instructions and data for operation of the processor. Memory and cache controllers denoted generally by a block 4 control communication of instructions and data from the on-chip memory with the two main processing units of the processor. The first main processing unit 6 is a scalar unit and the second main processing unit 8 is a vector unit. The construction and operation of these units will be described in more detail in the following. In brief, the scalar unit 6 comprises a scalar register file 10 and an ALU processing block 12. The vector unit 8 comprises a vector register file 14, a plurality of pixel processing units (PPU) denoted generally by a block 16 and scalar result unit 18. An instruction decoder 20 receives a stream of instructions from the on-chip memory 2 via the memory and cache controllers 4. As will be discussed in more detail hereinafter, the Instruction stream comprises distinct scatar and vector instructions which are sorted by the instruction decoder 20 and supplied along respective instruction paths 22, 24 to the scalar unit and to the vector unit depending on the instruction encoding. The results generated by the vector unit, in particular in the scalar result unit 18, are available to the scalar register file as denoted by arrow 26. The contents of the scalar register file are available to the vector register file as indicated diagrammatically by arrow 28. The mechanism by which this takes place is discussed later.

FIG. 1 is a schematic view only, as will be apparent from the more detailed discussion which follows. In particular, the processor includes an instruction cache and a data cache which are not shown in FIG. 1 but which are shown in subsequent figures.

Before discussing the detail of the processor architecture, the principles by which it operates will be explained.

The scalar and vector units 6, 8 share a single instruction space with distinct scalar and vector instruction encodings. This allows both units to share a single instruction pipeline, effectively residing in the instruction decoder 20 (implemented as a control and instruction decode module). Instructions are dispatched sequentially to either the scalar unit 6 or to the vector unit 8, depending on their encodings, where they run to completion as single atomic units. That is, the control and instruction decode module 20 waits for the previous instruction to complete before issuing a new instruction, even if the relevant unit is available to execute the new instruction.

The scalar unit 6 and vector unit 8 operate independently. However, communication between the two units is available because of the following two facets of the processor architecture. Both units can read and write data in the main on-chip memory 2. In addition, the vector unit can use registers in the register file 10, immediate values (fixed values defined in an instruction) and main memory accesses using values held in the scalar register file 10. The result of a vector operation in the vector unit 8 can then be written back into one of these scalar registers from the scalar result unit 18.

Figure 2:
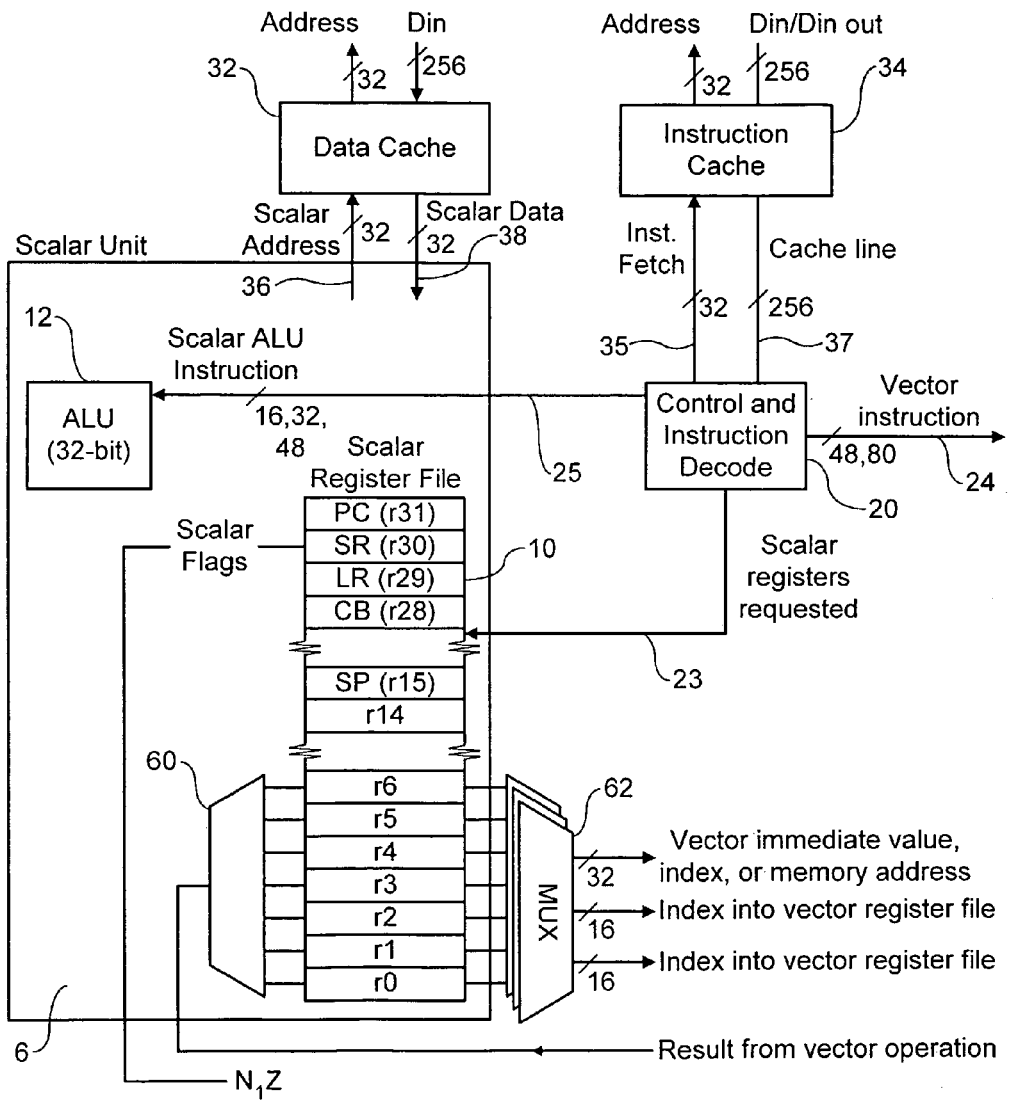
FIG. 2 is a schematic diagram of the scalar unit.

The scalar unit will now be described with reference to FIG. 2. As mentioned above, the instruction decoder 20 is implemented as a control and instruction decode module. The scalar unit communicates with an instruction cache 32 and a data cache 34 in a conventional fashion. In particular, the control and instruction decode module 20 issues instruction fetches along bus 35 and receives instructions along instruction cache line 37. A 256-bit sequence is received along cache line 37 for each instruction fetch, the number of instructions in each fetch depending on their encodings. Scalar addresses are supplied to the data cache 34 via bus 36 and data returned along bus 38. The control and instruction decode module 20 can be considered to supply scalar instructions along paths 23, 25 to the SRF 10 and ALU block 12 and vector instructions to the vector unit 8 along instruction path 24. The decision as to where to route an instruction is based on the instruction encodings as will be discussed in more detail in the following.

As a practical matter, the instruction decode unit 20 decodes the incoming instruction and sets a large number of control lines according to the instruction received. These control lines spread throughout the rest of the chip. Some of them feed into the scalar unit (some (23) to the scalar register file, some (25) to the scalar ALU). These lines are used when the instruction received was a scalar one.

Other lines feed into the vector unit 8 along path 24. These are distributed so that some lines feed to the vector register file 14, some to the PPUs 16 and so forth. These are used when the instruction was a vector one. In the case of the PPUs, there are six control lines feeding identically from the instruction decode unit 20 into each of the 16 PPUs. In fact, these lines are set directly from the "opcode bits" in the vector instruction (discussed later).

Each PPU will individually examine these six control lines and perform a singley operation on its inputs according to the current setting. Each of the 64 possible settings represents a singly specific instruction (though not all are currently used). A similar arrangement exists for the scalar ALU. When a scalar instruction is received, the instruction decode unit finds the correct "opcode bits" in the instruction and passes them along the control lines that run to the scalar ALU.

The scalar unit 6 also incorporates a scalar register file. There are thirty two 32-bit registers which are labelled $r_0 \ldots r_{31}$ in the scalar register file 10. The bottom sixteen registers $r_0$ to $r_{15}$ form the main working registers of the processor, accessible by all but a few specialised instructions. A subset of these working registers, the so-called core registers labelled $r_{0\ to\ r6}$, are available to the vector unit 8. These registers can be used to hold an immediate value, as an index into the vector register file, as an address for vector memory accesses or for storing results of vector operations.

The function of the other registers is not material to the present invention and is therefore not discussed further herein. It is however pointed out that one of the registers, $r_{31}$ constitutes the program counter which points to the address of the current instruction and thus is used to control instruction fetches. The scalar instruction set uses a standard encoding of 16 bits, with 32 bit and 48 bit variants to cater for large immediate and offset values. The instructions are grouped according to their register usage. That is, there are three groups labelled Group 1, Group 2 and Group 3.

Group 1 instructions comprises general purpose and single register scalar instructions which operate over the full register range, reading and writing to any of the scalar registers $r_0$ to $r_{30}$. Note that to simplify the control logic and avoid future pipeline constraints, the program counter PC ($r_{31}$) is only accessible to move and branch instructions. Instructions that fall into this group are:

| | | | | |
|---|---|---|---|---|
| btest | Rd,#u5 | add | Rd,Ra | |
| bmask | Rd,#u5 | sub | Rd,Ra | |
| mov | Rd,#u32 | and | Rd,Ra | |
| cmp | Rd,#s18 | or | Rd,Ra | |
| add | Rd,#s18 | asr | Rd,Ra | |
| sub | Rd,#b3 | shl | Rd,Ra | |
| asr | Rd,#u5 | cmp | Rd,Ra | |
| shl | Rd,#u5 | mov | Rd,Ra | |
| brev | Rd | mov | Rd,pc | |
| count | Rd | b | Ra | (mov pc,Ra) |
| abs | Rd | | | |

Rd,Ra = r0 . . . r30

Group 2 instructions operate on the so-called working registers $r_0$ to $r_{15}$ of the register file 10. The instructions that fall into this category are:

| | | | |
|---|---|---|---|
| addc | Rd,Ra | mul | Rd,Ra |
| subc | Rd,Ra | max | Rd,Ra |
| rsub | Rd,Ra | min | Rd,Ra |
| neg | Rd,Ra | ld | Rd,(Ra) |
| eor | Rd,Ra | st | Rd,(Ra) |
| not | Rd,Ra | ld | Rd,([--Ra/Ra++]) |
| lsr | Rd,Ra | st | Rd,([--Ra/Ra++]) |
| ror | Rd,Ra | mla | r0,Ra,Rb |
| btest | Rd,Ra | addscale | Rd,Ra shl #n2 |
| bmask | Rd,Ra | signexth | Rd,Ra |
| | | signextb | Rd,Ra |
| | | addcmpbCond | Rd,[Ra/#s4[,Rb,#s10h |
| | | addcmpbCond | Rd,[Ra/#s4],#u6,#s8h |

Rd,Ra,Rb = r0 ... r15

Group 3 instructions comprises the least frequently used instructions which operate only on the so-called core registers $r_0$ to $r_6$. The instructions that fall into this category are:

| | | | |
|---|---|---|---|
| add | Rd,Ra,Rb | mulhd.ss | Rd,Ra |
| sub | Rd,Ra,Rb | mulhd.su | Rd,Ra |
| asr | Rd,Ra,Rb | mulhd-us | Rd,Ra |
| shl | Rd,Ra,Rb | mulhd.uu | Rd,Ra |

Rd,Rb,Ra = r0 ... r6

Figures 3A, 3B:
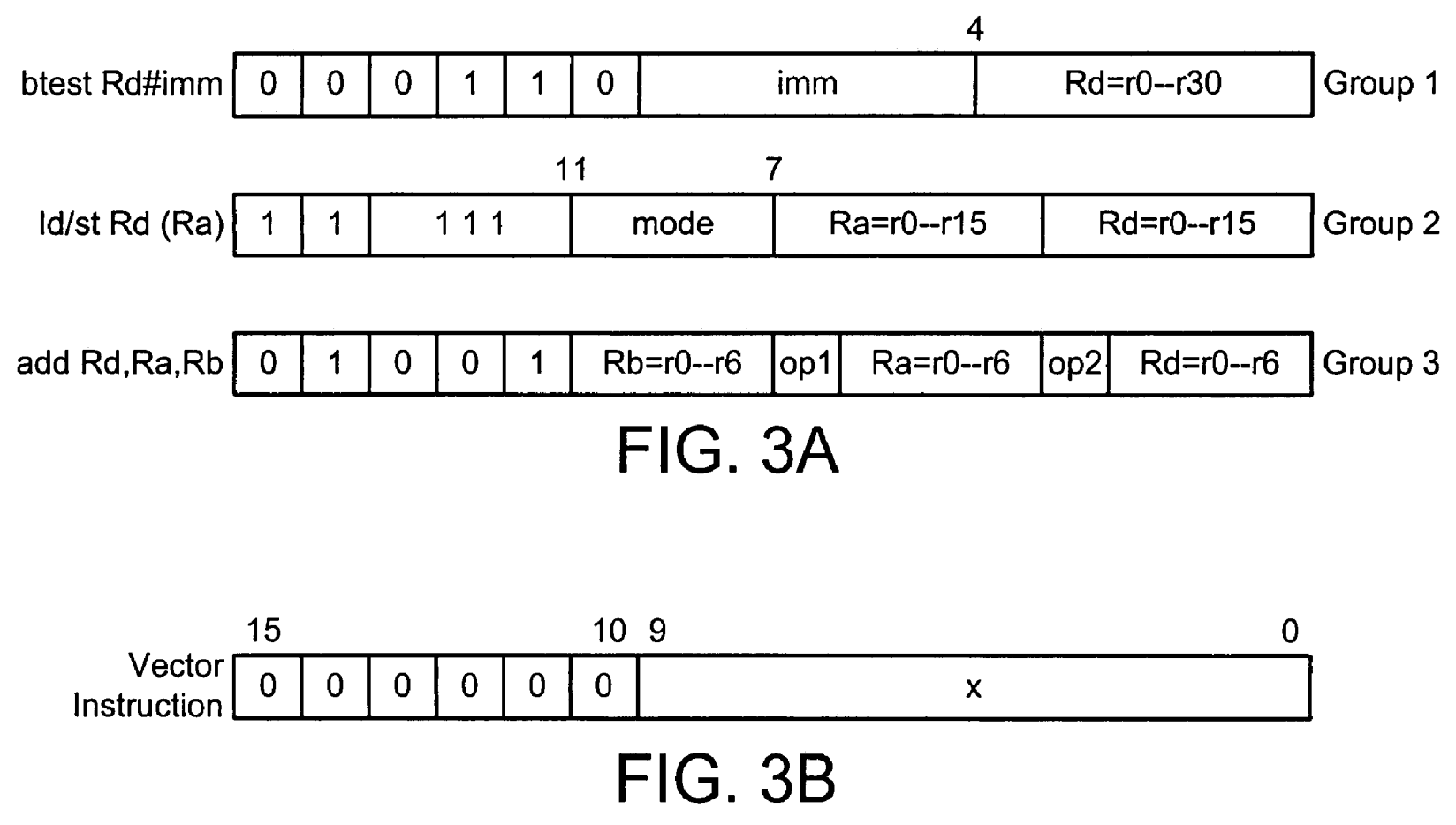

FIG. 3A illustrates example encodings from each of the three groups. Note that FIG. 3A shows examples in a 16 bit encoding only. The 32 bit or 48 bit encoding can be used for more complex and/or longer scalar instructions.

FIG. 3B illustrates bits 0 to 16 of a vector instruction. Of particular importance, it is to be noted that the 6 bit sequence 000000 in bits 10 to 15 of the instruction indicate that the instruction is not a scalar instruction but is in fact a vector instruction. This allows the instruction decoder 20 to distinguish between scalar instructions and vector instructions. Vector instructions are described in more detail later.

The vector unit 8 will now be described with reference to FIG. 4. The vector unit comprises sixteen 16 bit pixel processing units $PPU_0 \ldots PPU_{15}$ which operate in parallel on two sets of sixteen values. These sets of values can be retrieved as packed operands from the vector register file 14, from the scalar register file 10 or from the main memory 2. The results of the PPU operations are handled as described later.

The detail of the vector register file 14 is not germane to the present invention and therefore is not described in detail herein. However, it is to be noted that groups of sixteen contiguous pixels are written or read at once, each pixel value being represented originally by an 8-bit or 16-bit sequence.

Figure 5:
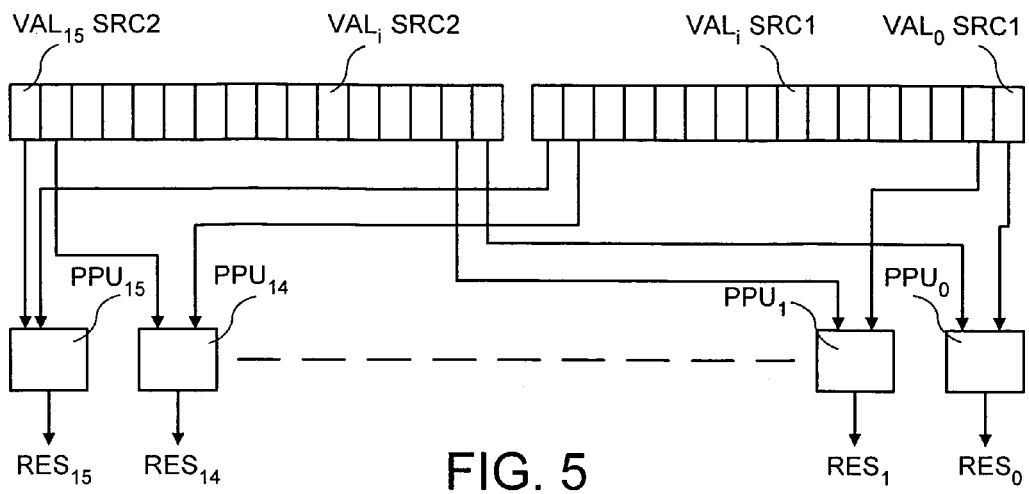
FIG. 5 is a schematic diagram illustrating parallel operation of multiple pixel processing units in the vector unit.

As illustrated in FIG. 5, each pixel processing,unit PPUi acts on two values. When the processor is a graphics processor, each value relates to a pixel. The vector instructions supply two operands to the pixel processing unit. These are labelled SRC1, denoting a first packed operand and SRC2, denoting a second packed operand in FIG. 5. Each operand comprises a plurality of values, in the described embodiment sixteen 16-bit values. A value from each operand is supplied to each pixel processing unit 16, such that PPUi operates on the ith element of the 16 element factors (operands) that have been processed simultaneously. An individual result is generated by each pixel processing unit, the result being labelled RESi in FIG. 5.

The pixel processing units $PPU_0 \ldots PPU_{15}$ will now be described with reference to FIG. 6. Each of the pixel processing units contains an ALU 50 which operates on two input 16-bit values VAL; SRC1, VAL; SRC2 supplied along paths 52, 54 respectively, to port A and port Op2 to create a single output value $RES_{out}$, according to the operation that has been selected by the vector instruction. Each pixel processing unit 16 has Z, N and C flags denoted generally by the flag block 56. The Z flag denotes a zero flag, the N flag denotes a negative flag and the C flag is a carry flag. The function of these flags is not germane to this invention and is not described further herein. Each pixel processing unit includes an adder 58 and an accumulator 59, which allow the result of the ALU operation to be accumulated and then returned. The thus accumulated value is denoted $V_{acc}$. The output of each pixel processing unit 16 is supplied at port D to the vector register file and to the scalar result unit 18. It will be clear from this that a vector instruction can have two "destinations", one being the VRF where PPU results are returned and the other being the SRF where the result of the SRU operation is returned. In particular, the values that emerge from the PPUs are in essence always fed both back to the VRF and the SRU. There are just a few qualifications, including the possibility that the destination register of a vector instruction my be given as "–" meaning "do not write the result back". In this case, no values are returned to the VRF. The values are still passed on to the SRU as usual, however.

The scalar result unit 18 operates on the outputs of the pixel processing unit 16, depending on the operation defined in the vector instruction supplied to the vector unit. This value is then written back to the scalar register file 10 in the scalar unit 6 and the scalar flags N, Z are updated according to it. A demultiplexer 60 (FIG. 4) in the scalar unit 6 writes the value to the correct one of the core registers $r_0 \ldots r_6$. Likewise, a set of multiplexers 62 supply the outputs of the core registers $r_0 \ldots r_6$ to the vector register file via address calculation logic 64 according to whether the value is a vector immediate value, index or memory address of 32 bits, or respective 16 bit indices into the vector register file.

Values can be supplied to the pixel processing units 16 in a number of different ways. The use of a 16 bit index creates an address via address calculation logic 64A into the vector register file into the port marked $A_{addr}$. This causes data held in the vector register file to be supplied to the pixel processing units 16 into port A along path 52 in FIGS. 4 and 5. Data can also be accessed from port B by using an index which has created an address for the vector register file into the port marked $B_{addr}$.

This data can be supplied to the port Op2 of the pixel processing unit 16 via a multiplexer 64. Multiplexer 64 also allows for data to be accessed directly from the scalar register file 10 by taking a value held in one of the core registers $r_0 \ldots r_6$ and supplying it through a replicate unit 66, which replicates it 16 times.

Figure 4:
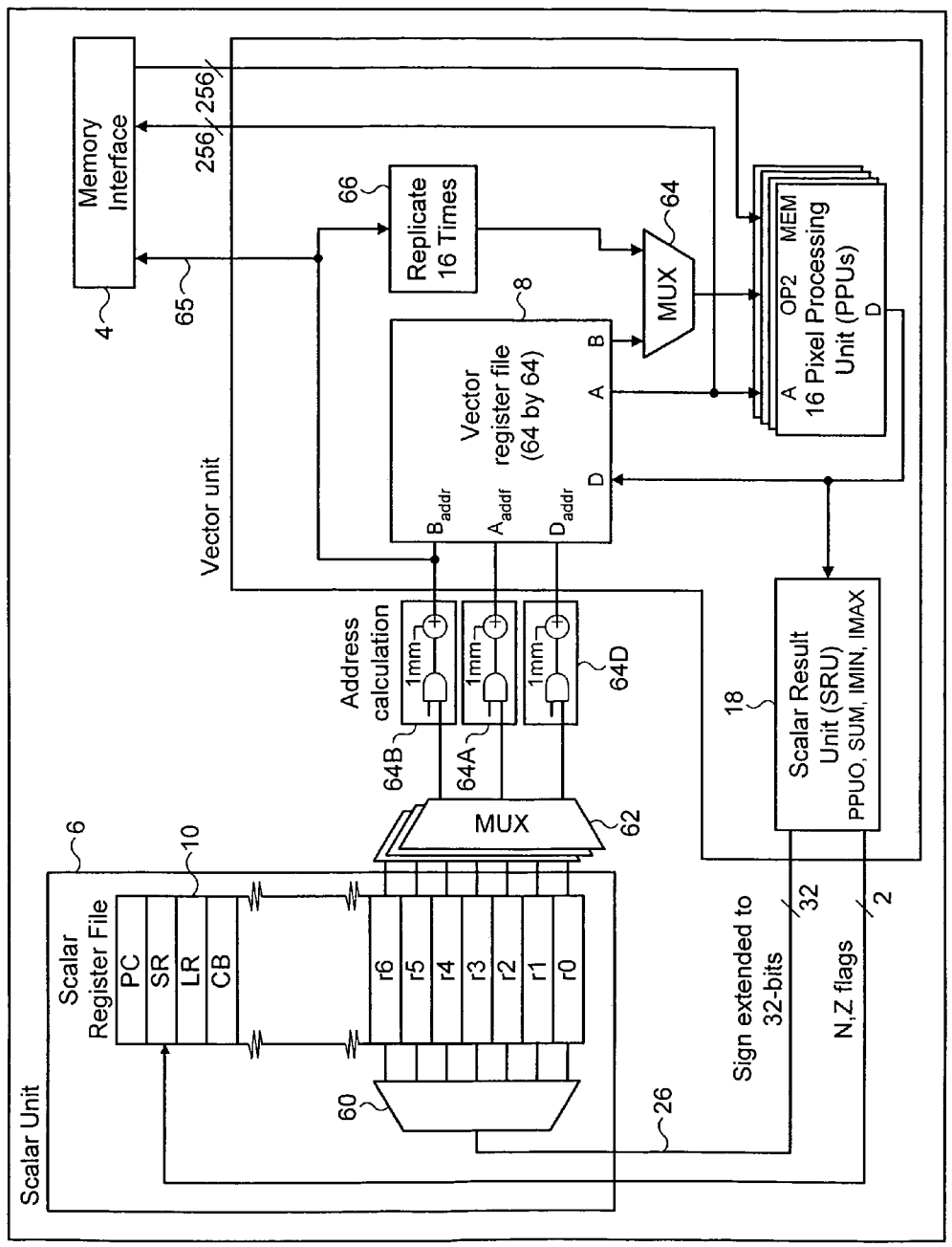
FIG. 4 is a schematic block diagram of a vector unit.

An alternative supply of data to the pixel processing unit 16 is directly from on-chip memory 2 via the memory interface 4 (FIG. 4). In this case, an address calculated by address calculation logic 64B is used as an address into main memory along address bus 65, and data access thereby is supplied to port MEM of the pixel processing unit.

The replicate unit 66 can also act on an immediate value in a vector instruction as well as on the contents of a core register in the scalar register file 10.

Figure 6:
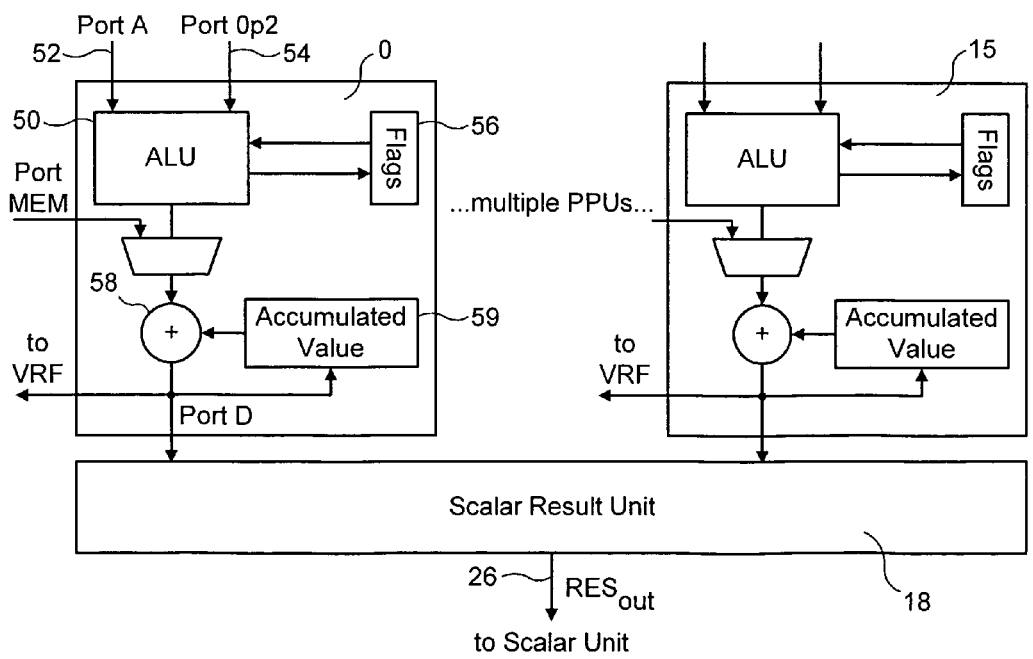
FIG. 6 is a schematic diagram illustrating the internal circuitry of pixel processing units.

From this discussion it will be appreciated that the input labelled 54 in FIG. 6 to the pixel processing units can supply either values from the vector register file, values from the scalar register file or values directly from memory to the ALU.

With a small number of exceptions, almost all vector instructions have a general three operand form:

<operation> R(yd,xd), R(ya,xa), Op2 [<modifiers>]

where operation is the name of the operation to be performed, and registers in the vector register file are generically denoted R(y,x) due to the addressing semantics of the vector register file (not discussed herein). In the above example R(yd,xd) is the destination register, R(ya,xa) is the first source register and Op2 may indicate a second source register R(yb,xb), or a value taken from one of the scalar registers $r_0$ to $r_6$, or an immediate value (these latter two being repeated identically across all sixteen PPUs), as explained above. Finally <modifiers> are selected from an optional list of instruction modifiers which control how the PPUs 16 and the scalar result unit handle the results of the ALU operations in each PPU. The following description discusses a modifier which affects the PPUs and modifiers which affect the scalar result unit.

Once such modifier affecting the PPU is the "accumulate" modifier ACC. This modifier instructs the pixel processing unit 16 to add the result of the ALU operation to the current value of the accumulator 59. This addition is always performed using 16 bit signed saturating arithmetic. When the "accumulate" modifier ACC is specified, then the accumulated value, not the output of the ALU, becomes the final output read by the pixel processing unit. This means that the accumulated value will be written back to the destination register at port D.

The vector instructions operate on the pixel processing unit 16 in the following way.

Each of the sixteen pixel processing units is presented with two 16-bit values, one derived from R(ya,xa) and one derived from Op2. (Note that if 8-bit values are read from the vector register file then these are zero extended into 16-bit values.)

Each pixel processing unit performs its operation in accordance with the nature of the operation defined in the instruction. The operation is executed by the ALU 50. If an instruction modifier specifies accumulation of the results, then this takes place. In this case the accumulated values are returned as the final output values of the pixel processing units 16, otherwise the output of the ALU operation is returned as the final output of the pixel processing unit. The scalar result unit 18 performs any calculations indicated by modifiers. The scalar result unit operates on the final outputs from the pixel processing units 16 and the result may be written to one of the scalar registers $r_0$ to $r_6$, and the scalar flags will be set accordingly. The final outputs of the pixel processing units are also written back to the vector register file at port D (in FIGS. 4 and 6).

The vector instruction set can be thought of as being constituted by four types of instructions:
load/store instructions
move instruction
data processing instructions
look up instructions.

It is to be noted that in writing the program, all vector instructions are preceded by v to denote that they are vector instructions. In the encoding, bits 10 to 15 are set to zero so that the fact that they are vector instructions can be recognised by the instruction decoder. Each instruction type has an 80-bit full encoding, and common types have a compact 48-bit encoding. By way of example, FIG. 6 illustrates the compact 48-bit encoding and full 80-bit encodings for data processing instructions of the following form:

<operation> R(yd,xd), R(ya,xa), Op2.

Note that all instructions contain six bits to hold opcode identifying the nature of the instruction (bits 3 to 8 of Half-Word 0, labelled I[0] to I[5]). These bits are supplied to each of the PPUs 16. Also note that bit 9 labelled CMPT is a flag which is set to one to indicate a compact 48-bit encoding and zero to indicate the full 80-bit encoding.

The main categories of vector instructions are discussed below.

Load/Store Instructions

Vld R(yd,xd), (rx+#immediate)

Load sixteen consecutive bytes or sixteen bit half words from memory into the vector register file.

The load instructions identify a destination register in the vector register file and identify a source operand by virtue of its address in main memory. Its address in main memory is calculated from the content of a register rx in the scalar register file 10 using the address calculation logic $64_B$ and the resulting operand is supplied to port MEM.

The store instructions identify a set of operands in the vector register file and cause them to be stored back to memory at an address identified using the contents of a scalar register. The instruction has the following format:

Vst R(ya,xa), (rx+#immediate).

Store sixteen consecutive bytes or half words from the VRF back to memory. The memory address is calculated using the address calculation logic $64_B$ as before.

In both cases, if R(y,x) denotes an 8-bit register, sixteen bytes are stored. If R(y,x) denotes a 16-bit register, half words are stored.

Move Instructions vmov R(yd,xd), Op2 moves OP2 to R(yd,xd).

In this case, Op2 may be a value from a scalar Register rx, or an immediate value or an immediate value plus the value from a scalar register rx, or a VRF register R(yb,xb) accessed from port B in FIG. 4. In this case therefore there are a number of options for identifying the location of the source value, the destination location being identified in the vector register file.

Data Processing Instructions

All these instructions take the usual form:

<operation> R(yd,xd) R(ya,xa) Op2.

A number of different operations can be specified, including addition, subtraction, maximum, minimum, multiply, etc.

Look-up instructions are specialised instructions having the form:

lookup R (yd,xd)

and are not discussed further herein. They allow access to the vector register file, the addressing semantics of which are not discussed further herein.

As mentioned above, the scalar result unit 18 can implement different operations as defined by modifiers in the vector instructions.

The SRU 18 calculates a 32-bit value from the 16 PPU outputs and writes this result back to one of the scalar registers r0 to r6, denoted by rx. The scalar unit N and Z flags are both updated by this process, with the C and V flags left unaffected. The modifiers that apply to the SRU are given in Table I.

TABLE I

| Modifier | Description |
| --- | --- |
| PPU 0rx | Place the output of $PPU_0$ into register rx |
| SUM rx | Sum all PPU outputs and place the result in rx |
| IMIN rx | Place the index (0 ... 15) of the minimum PPU output in rx |
| IMAX rx | Place the index (0 ... 15) of the maximum PPU output in rx |

PPU0

The output of the first PPU ($PPU_0$) is placed into scalar register rx, and the scalar flags updated accordingly.

SUM

All active PPUs are summed and the result placed in rx, updating the scalar flags accordingly. If no PPUs are selected, then the result is always zero.

IMIN

The index i (running from 0 to 15) of $PPU_i$ that contains the minimum value of any active PPUs is placed in rx, and the scalar flags updated. If no PPUs are active, then the result is −1. If two or more PPUs share the same minimum, the lowest valued index is returned.

IMAX

The index i of $PPU_i$ that contains the maximum value of any active PPUs is placed in rex, and the scalar flags updated. If no PPUs are active, then the result is −1. If two or more PPUs share the same maximum, the highest valued index is returned.

None of these SRU modifiers can be mixed with one another.

The invention claimed is:

1. A processor for instruction execution comprising:
a scalar unit for executing scalar instructions each defining a single value pair;
a vector unit for executing a vector instruction defining multiple value pairs, the vector unit comprising a plurality of processing units each operable to process one of said multiple value pairs and a scalar result unit for receiving a sct of parallel results from the processing units and generating a scalar result, wherein the generation of the scalar result is based on a modifier in the vector instruction; and
an instruction decoder for receiving a single stream of instructions including scalar instructions and vector instructions and operable to directing scalar instructions to the scalar unit and vector instructions to the vector unit.

2. The processor of claim 1, wherein the scalar result is one result from the set of parallel results.

3. The processor of claim 1, wherein the multiple value pairs are based on at least one value stored in a scalar register file.

4. The processor of claim 1, wherein the vector unit comprises a vector register file holding one or more operands addressable by said vector instructions for supply to the processing units, each operand being a packed operand comprising a plurality of values.

5. The processor of claim 4, wherein each value pair comprises a value from a first packed operand and a second packed operand.

6. The processor of claim 1, wherein each instruction comprises a destination address identifier, denoting a storage location for holding a result of execution of the instruction.

7. The processor of claim 6, wherein the storage location is a register in the vector unit.

8. The processor of claim 6, wherein the storage location holds the scalar result generated by the scalar result unit.

9. The processor of claim 1, wherein the vector instruction further comprises an immediate value, and wherein the multiple value pairs arc bawd on the immediate value.

10. The processor of claim 1, wherein the plurality of processing units performs an operation on an image comprising a plurality of pixel values.

11. The processor of claim 1, wherein the processor further comprises an instruction memory for holding a program in the form of instructions in a common instruction space.

12. The processor of claim 1, wherein the processor further comprises a data memory for holding data values.

13. The processor of claim 1, wherein scalar instructions are encoded optionally in 16-bit, 32-bit and 48-bit forms.

14. The processor of claim 1, wherein vector instructions are encoded optionally in 48 and 80-bit forms.

15. The processor of claim 1, wherein vector instructions and scalar instructions each include a bit sequence at predetermined bit locations, said bit sequence being detectable by the instruction decoder to identify an instruction as a scalar instruction or a vector instruction.

16. The processor of claim 15, wherein the bit sequence in vector instructions is all zeros.

17. The processor of claim 1, wherein the scalar result unit further generates a sum of the set of parallel results.

18. The processor of claim 1, wherein the scalar result is an index of a maximum value in the set of parallel results.

19. The processor of claim 1, wherein the scalar result is an index of a minimum value in the set of parallel results.

20. The processor of claim 1, wherein the scalar result is a maximum value in the set of parallel results.

21. The processor of claim 1, wherein the scalar result is a minimum value in the set of parallel results.

22. A method of operating a processor having a scalar unit and a vector unit, the method comprising:
fetching a stream of instructions including scalar instructions and vector instructions;
decoding said instructions and supplying a scalar instruction to the scalar unit for execution, and a vector instruction to the vector unit for execution;
in the vector unit, executing the vector instruction in a plurality of processing units, thereby producing a plurality of vector results; and
in the vector unit, processing the plurality of vector results to form a scalar result based on a modifier in the vector instruction.

23. The method of claim 22, wherein the method further comprises summing the plurality of vector results.

24. The method of claim 22, wherein the scalar result is an index of a maximum value in the plurality of vector results.

25. The method of claim 22, wherein the scalar result is an index of a minimum value in the plurality of vector results.

26. The method of claim 22, wherein the scalar result is a maximum value in the plurality of vector results.

27. The method of claim 22, wherein the scalar result is a minimum value in the plurality of vector results.

28. An integrated circuit for vector processing, wherein the integrated circuit comprises:
a memory having stored thereon a computer program comprising a common instruction space including executable instruction streams, each instruction stream including scalar instructions and vector instructions, wherein each scalar instruction defines a single operand set and each vector instruction defines multiple operand sets;

a scalar unit for executing the scalar instructions;

a vector unit for executing the vector instructions to form a set of parallel results, wherein a scalar result is generated based on a modifier in the vector instruction.

29. The integrated circuit of claim 28, wherein the vector unit further comprises a summer for summing the set of parallel results.

30. The integrated circuit of claim 28, wherein the scalar result is an index of a maximum value in the set of parallel results.

31. The integrated circuit of claim 28, wherein the scalar result is an index of a minimum value in the set of parallel results.

32. The integrated circuit of claim 28, wherein the scalar result is a maximum value in the set of parallel results.

33. The integrated circuit of claim 28, wherein the scalar result is a minimum value in the set of parallel results.

* * * * *